(12) United States Patent
Kim et al.

(10) Patent No.: US 8,964,275 B2
(45) Date of Patent: Feb. 24, 2015

(54) DISPLAY APPARATUS AND METHOD FOR MANUFACTURING THE SAME

(75) Inventors: Min-Woo Kim, Cheonan-si (KR);
Soo-Min Baek, Cheonan-si (KR);
Il-Nam Kim, Hwaseong-si (KN);
Jae-Kyoung Kim, Seoul (KR);
Won-Sang Park, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 90 days.

(21) Appl. No.: 13/286,307

(22) Filed: Nov. 1, 2011

(65) Prior Publication Data
US 2013/0038921 A1    Feb. 14, 2013

(30) Foreign Application Priority Data

Aug. 11, 2011   (KR) .................. 10-2011-0080211

(51) Int. Cl.
*G02B 26/02* (2006.01)
*G02F 1/01* (2006.01)
*G02F 1/167* (2006.01)
*G02F 1/1335* (2006.01)

(52) U.S. Cl.
CPC .......... *G02F 1/167* (2013.01); *G02F 1/133512* (2013.01); *G02F 2001/1672* (2013.01); *G02F 2001/1676* (2013.01)

USPC .............................. 359/228; 359/240; 430/32

(58) Field of Classification Search
USPC ............ 359/227–228, 237, 290–297; 430/32, 430/35–36
See application file for complete search history.

(56) References Cited

U.S. PATENT DOCUMENTS

| 7,411,721 | B2 * | 8/2008 | Ikeda ............................. 359/296 |
| 2005/0190431 | A1 * | 9/2005 | Matsuda ....................... 359/296 |
| 2011/0234562 | A1 * | 9/2011 | Hong et al. ................... 345/211 |
| 2011/0261433 | A1 * | 10/2011 | Sprague et al. ............... 359/296 |

FOREIGN PATENT DOCUMENTS

| KR | 10-0553055 | 2/2006 |
| KR | 10-2008-0099541 | 11/2008 |
| KR | 10-2009-0004282 | 1/2009 |
| KR | 10-2010-0022682 | 3/2010 |

* cited by examiner

*Primary Examiner* — Ricky Mack
*Assistant Examiner* — Robert E Tallman
(74) *Attorney, Agent, or Firm* — Robert E. Bushnell, Esq.

(57) ABSTRACT

A display apparatus may include a first substrate having one or more unit pixel regions defined and including a driving thin film transistor, a second substrate disposed on the first substrate and facing the first substrate, and a color absorbing layer disposed on the first substrate.

18 Claims, 12 Drawing Sheets

DISPLAY APPARATUS AND METHOD FOR MANUFACTURING THE SAME

CLAIM OF PRIORITY

This application makes reference to, incorporates the same herein, and claims all benefits accruing under 35 U.S.C. §119 from an application earlier filed in the Korean Intellectual Property Office on the 11 of Aug. 2011 and there duly assigned Ser. No. 10-2011-0080211.

BACKGROUND OF THE INVENTION

1. Field of the Invention

The present invention relates to a display apparatus, and more particularly, to a display apparatus which can implement a color picture, and a method for manufacturing the display apparatus.

2. Description of the Related Art

With the rapid evolution of information technology, use of low power, lightweight, thin and high resolution display apparatuses has been growing. In recent years, demand for low power, lightweight, thin and high resolution display apparatuses has risen. To keep up with the demand, development of liquid display apparatuses (LCDs) or organic light emitting display devices (OLED) using organic light emitting characteristics is underway.

In addition, an electrophoretic display (EPD), such as an e-book or an e-newspaper convenient to read, capable of reducing eye fatigue and replacing the existing book or newspaper, has recently been drawing intense attention.

In order to drive the electrophoretic display in a color mode, instead of a black-and-white mode, a color filter may be employed. In addition, in order to move charged particles in the EPD, electrodes are used.

To drive the EPD as a top viewing type display apparatus in a color mode, a color filter is employed at an upper substrate. In a case where a color mode is implemented using a color filter, a considerable amount of incident light is reduced while passing through the color filter, and only a small amount of reflected light can be viewed. Thus, it is difficult to implement a high-brightness color, and display quality may deteriorate so as to reduce color sensitivity.

Alternatively, the EPD may be manufactured by bonding an upper substrate having a color filter to a lower substrate (TFT substrate). In this case, it is difficult to accurately align the upper substrate and the lower substrate. If the upper substrate and the lower substrate are misaligned, color mixing may occur, resulting in a considerable reduction in color purity.

SUMMARY OF THE INVENTION

The present invention provides a display apparatus capable of implementing high luminance, high contrast ratio (C/R) and excellent color sensitivity, and a method for manufacturing the display apparatus.

The present invention also provides a display apparatus which can improve misalignment of upper and lower substrates of the display apparatus, and a method for manufacturing the display apparatus.

The present invention also provides a display apparatus which can prevent cross-talk and an aperture ratio loss.

The above and other objects of the present invention will be described in, or be apparent from, the following description of the preferred embodiments.

According to an aspect of the present invention, there is provided a display apparatus which may include a first substrate having one or more unit pixel regions defined and including a driving thin film transistor, a second substrate facing the first substrate and disposed on the first substrate, and a color absorbing layer disposed on the first substrate.

According to another aspect of the present invention, there is provided a display apparatus which may include a first substrate having one or more unit pixel regions defined and including a driving thin film transistor, a second substrate facing the first substrate and disposed on the first substrate, a partition wall disposed between the first substrate and the second substrate, a first electrode formed between the partition wall and the second substrate, and a light blocking layer formed between the first electrode and the second substrate.

According to another aspect of the present invention, there is provided a method for manufacturing a display apparatus. The method may include preparing a first substrate having one or more unit pixel regions defined and including a driving thin film transistor, preparing a second substrate facing the first substrate and disposed on the first substrate, and disposing a color absorbing layer on the first substrate.

The embodiments of the present invention have the following effects and advantages.

The display apparatus, in particular, the EPD apparatus, can implement high luminance, high contrast ratio (C/R), and excellent color sensitivity.

In addition, misalignment of upper and lower substrates can be improved by forming a color filter on the lower substrate of the display apparatus, thereby preventing color mixing.

Furthermore, cross-talk can be prevented and aperture ratio loss can be prevented by forming an electrode on a lower substrate of the display apparatus and another electrode between an upper substrate and a partition wall of the display apparatus.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
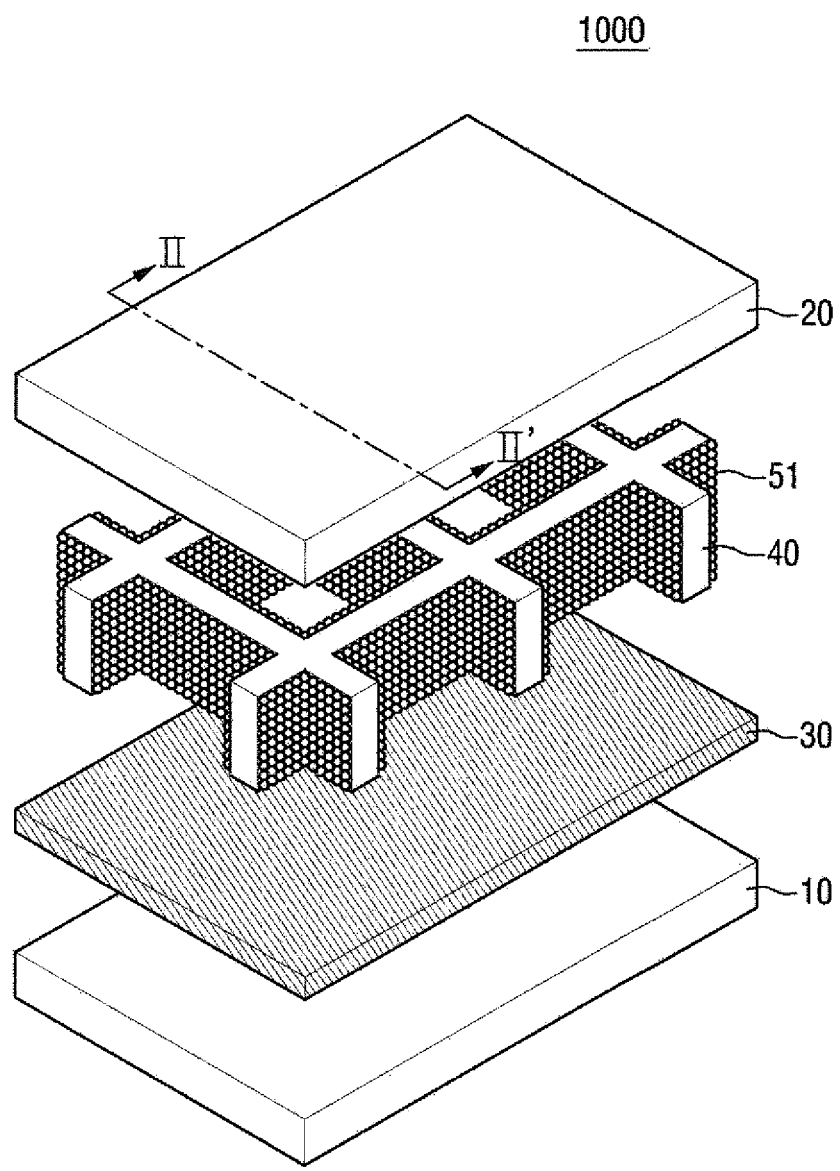
FIG. 1 is an exploded perspective view of a display apparatus according to an embodiment of the present invention.

Advantages and features of the present invention and methods of accomplishing the same may be understood more readily by reference to the following detailed description of exemplary embodiments and the accompanying drawings. The present invention may, however, be embodied in many different forms, and should not be construed as being limited to the embodiments set forth herein. Rather, these embodiments are provided so that this disclosure will be thorough and complete and will fully convey the concept of the invention to those skilled in the art, and the present invention will only be defined by the appended claims. In the drawings, sizes and relative sizes of elements may be exaggerated for clarity.

Like reference numerals refer to like elements throughout the specification. As used herein, the term "and/or" includes any and all combinations of one or more of the associated listed items.

The terminology used herein is for the purpose of describing particular embodiments only, and is not intended to be limiting of the invention. As used herein, the singular forms are intended to include the plural forms as well, unless the context clearly indicates otherwise. It will be further understood that the terms "comprises" and/or "made of," when used in this specification, specify the presence of stated components, steps, operations, and/or elements, but do not preclude the presence or addition of one or more other components, steps, operations, elements, and/or groups thereof It will be understood that, although the terms first, second, third, etc. may be used herein to describe various elements, these elements should not be limited by these terms. These terms are only used to distinguish one element from another element. Thus, a first element discussed below could be termed a second element without departing from the teachings of the present invention Embodiments of the invention are described herein with reference to planar and cross-section illustrations that are schematic illustrations of idealized embodiments of the invention. As such, variations from the shapes of the illustrations as a result, for example, of manufacturing techniques and/or tolerances are to be expected. Thus, embodiments of the invention should not be construed as being limited to the particular shapes of regions illustrated herein, but are to include deviations in shapes that result, for example, from manufacturing. Thus, the regions illustrated in the figures are schematic in nature, and their shapes are not intended to illustrate the actual shape of a region of a device, and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art, and should not be interpreted in an idealized or overly formal sense unless expressly so defined herein.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present invention.

Hereinafter, the present invention will be described in further detail with reference to the accompanying drawings.

A display apparatus according to an embodiment of the present invention will now be described in more detail with reference to FIG. 1.

Hereinafter, embodiments of the present invention will be described with reference to the accompanying drawings. In the following description, the display apparatus of the present invention will be described with regard to an EPD apparatus, but is not limited thereto.

Figure 2:
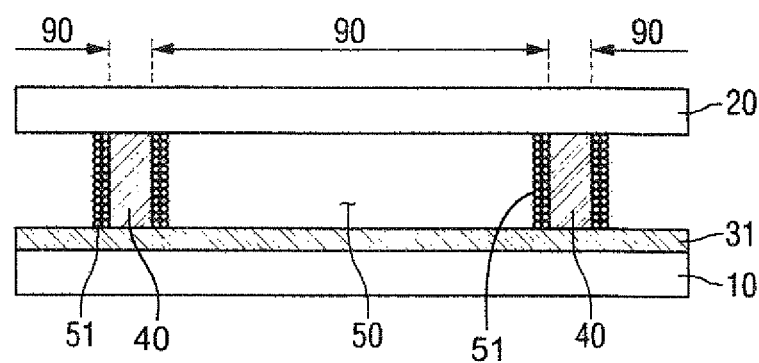
FIGS. 2 and 3 are sectional views of the display apparatus shown in FIG. 1.
Figure 3:
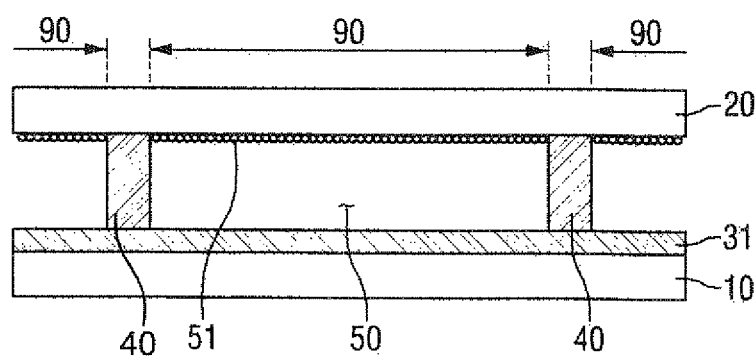

FIG. 1 is an exploded perspective view of a display apparatus according to an embodiment of the present invention, and FIGS. 2 and 3 are sectional views of the display apparatus shown in FIG. 1.

Referring to FIGS. 1 and 2, the display apparatus includes a first substrate 10, a second substrate 20, a color absorbing layer 30 disposed on the first substrate 10, a partition wall 40 disposed between the first substrate 10 and the second substrate 20, and an electrophoretic layer 50.

The first substrate 10 may be made of an insulating material such as glass or plastic. The second substrate 20 may be made of an insulating material such as glass or plastic. The first substrate 10 and the second substrate 20 may be made of substantially the same material. For example, the first substrate 10 and the second substrate 20 may both be transparent substrates made of glass. Alternatively, in a case where the electrophoretic display is a top viewing type display, the first substrate 10 needs to be a transparent substrate, but the second substrate 20 may be an opaque substrate.

The first substrate 10 and the second substrate 20 are disposed so as to face each other. One or more unit pixel regions are defined on the first substrate 10. Furthermore, one or more unit pixel regions may also be defined on the second substrate 20. The respective unit pixel regions of the first substrate 10 and those of the second substrate 20 may be provided in one-to-one correspondence, forming a unit pixel region space. In some embodiments, each of the unit pixel regions may be a pixel region for displaying a color.

Referring to FIGS. 2 and 3, neighboring unit pixel regions may be spaced apart from each other. In some other embodiments, neighboring unit pixel regions maybe arranged so as to be adjacent to each other.

On the first substrate 10 may be formed at least one conductive material layer and at least one insulating material layer. The conductive material layer may include various electrodes and interconnections for applying signals to the electrodes. The interconnections may include a plurality of gate lines, a plurality of data lines, a pixel electrode, and so on.

The gate lines may extend in a first direction of the first substrate 10. For example, the gate lines may extend in a horizontal direction on the first substrate 10. The gate lines may be formed of a single layer made of a metal such as silver (Ag), aluminum (Al), or alloys thereof. Alternatively, the gate lines maybe formed of multiple layers having the single layer and another layer made of a material having good physical electrical contact characteristics, such as chromium (Cr), titanium (Ti), or tantalum (Ta).

The data lines may extend in a second direction of the first substrate 10. For example, the data lines may extend in a vertical direction on the first substrate 10. The data lines may be formed of a single layer made of a metal such as silver (Ag), aluminum (Al), or alloys thereof. Alternatively, the data lines may be formed of multiple layers having the single layer and another layer made of a material having good physical electrical contact characteristics, such as chromium (Cr), titanium (Ti), or tantalum (Ta). The data lines and the gate lines are formed on the first substrate 10 and define unit pixel regions arranged in a matrix type.

One or more switching elements may be formed on the first substrate 10. In some embodiments, thin film transistors (TFTs) connected to the gate lines and the data lines may also be formed on the first substrate 10. The TFTs may correspond to one or more pixel electrodes to turn on or off voltages applied to the pixel electrodes.

The insulating material layer formed on the first substrate 10 may include a gate insulating layer, an interlayer dielectric film, and/or a passivation layer.

The one or more conductive material layers and the one or more insulating layers are appropriately arranged in the unit pixel regions of the first substrate 10, thereby enabling independent driving of pixels. One pixel electrode corresponding to one pixel region may be disposed on the pixel region, but aspects of the present invention are not limited thereto. Alternatively, two or more pixel electrodes may be arranged in one pixel region.

In the illustrated embodiment, for brevity of explanation, only pixel electrodes are arranged on the first substrate 10 and one pixel region is occupied by one pixel electrode. However, it should be easily understood by one skilled in the art that the conductive material layers and the insulating material layers may also be appropriately arranged on the first substrate 10. The pixel electrodes arranged on the first substrate 10 will later be described with reference to FIG. 4.

The color absorbing layer 30 is disposed on the first substrate 10. The color absorbing layer 30 is capable of absorbing light having at least a specific wavelength or in a specific wavelength range.

Therefore, in a top viewing type display apparatus, some of the light incident from the second substrate 20 of the display apparatus, which has at least a specific wavelength or in a specific wavelength range, is absorbed by the color absorbing layer 30, and the other is reflected. Thus, only the light of a color reflected by the color absorbing layer 30 can be viewed by a user. In some embodiments, the color absorbing layer 30 may be a black matrix or a color filter. In addition, the color absorbing layer 30 may include a material capable of reflecting light.

Referring to FIGS. 1 through 3, the color absorbing layer 30 may be disposed over the entire surface of the first substrate 10. In some embodiments, the color absorbing layer 30 may be formed in unit pixel regions of the first substrate 10, which will be described later with reference to FIGS. 7 through 10.

The EPD apparatus may include a partition wall 40 disposed between the first substrate 10 and the second substrate 20. The partition wall 40 may be formed in pillar shapes and may separate the unit pixel regions defined on the first substrate 10 and the second substrate 20 from one another. That is to say, the partition wall 40 may be disposed between each of the spaced-apart unit pixel regions in order to separate the respective unit pixel regions defined on the first substrate 10 and the second substrate 20 from one another. In some embodiments, when unit pixel regions are defined to be adjacent to each other, the partition wall 40 may be disposed such that at least some of the unit pixel regions are occupied by the partition wall 40.

The partition wall 40 disposed between the first substrate 10 and the second substrate 20 may form a unit pixel region space together with one unit pixel region of the first substrate 10 and one unit pixel region of the second substrate 20. The unit pixel region space may be filled with an electrophoretic layer 50.

The electrophoretic layer 50 may include a fluid. Furthermore, the electrophoretic layer 50 may include colored charged particles dispersed in the fluid. The fluid included in the electrophoretic layer 50 may be a gas or a liquid solvent. The fluid may protect the colored charged particles dispersed therein from external shocks.

The colored charged particles dispersed in the electrophoretic layer 50 have a specific color and may be positively or negatively charged. The colored charged particles may be white, black or a chromatic color. In some embodiments, the colored charged particles may include both white charged particles 51 (see FIGS. 1, 2 and 3) and black charged particles 52 (see FIGS. 8, 9 and 10). In some other embodiments, the colored charged particles may include only white charged particles 51 or black charged particles 52. Referring to FIGS. 2 and 3, the EPD apparatus includes the electrophoretic layer 50 which includes only white charged particles 51. The EPD apparatus including the electrophoretic layer 50 which includes black charged particles 52 will be described later with reference to FIGS. 8 and 9.

Hereinafter, a driving mechanism of the aforementioned display apparatus according to an embodiment of the present invention will be described. For brevity of explanation, it is assumed that the colored charged particles dispersed in the electrophoretic layer 50 are white charged particles 51, but it is obvious that the colored charged particles may also be black charged particles 52.

Referring to FIG. 2, the color absorbing layer 30 disposed on the first substrate 10 is a black matrix 31, the white charged particles 51 dispersed in the electrophoretic layer 50 move toward the partition wall 40 so as to then be positioned therearound. In order to move the white charged particles 51, the EPD apparatus may include a first electrode 60 and a second electrode 70, which will be described in detail later with reference to FIGS. 4 and 5.

Referring to FIG. 2, the color absorbing layer 30 is disposed on the first substrate 10 and the white charged particles 51 dispersed in the electrophoretic layer 50 move toward the partition wall 40 so as to then be positioned therearound. Here, the color absorbing layer 30 (of FIG. 1) is a black matrix 31 of FIG. 2. Assuming that light is incident on a top surface of the second substrate 20 shown in FIG. 2, the light passes through the second substrate 20 to reach the black matrix 31. The black matrix 31 absorbs light of all colors, and the light of black color can be viewed from the top surface of the second substrate 20.

In some embodiments, the color absorbing layer 30 (of FIG. 1) may be a color filter. If the color filter is a red color filter, only red light from the light, having passed through the second substrate 20 and having reached the color filter, can be viewed from the second substrate 20.

Referring to FIG. 3, the black matrix 31 is disposed on the first substrate 10, as in FIG. 2, but the white charged particles 51 dispersed in the electrophoretic layer 50 move toward the second substrate 20 so as to then be positioned therearound. Assuming that the light is incident on the top surface of the second substrate 20 in FIG. 3, the light passes through the second substrate 20 so as to then reach the white charged particles 51. Therefore, the white light can be viewed from the top surface of the second substrate 20.

Figure 4:
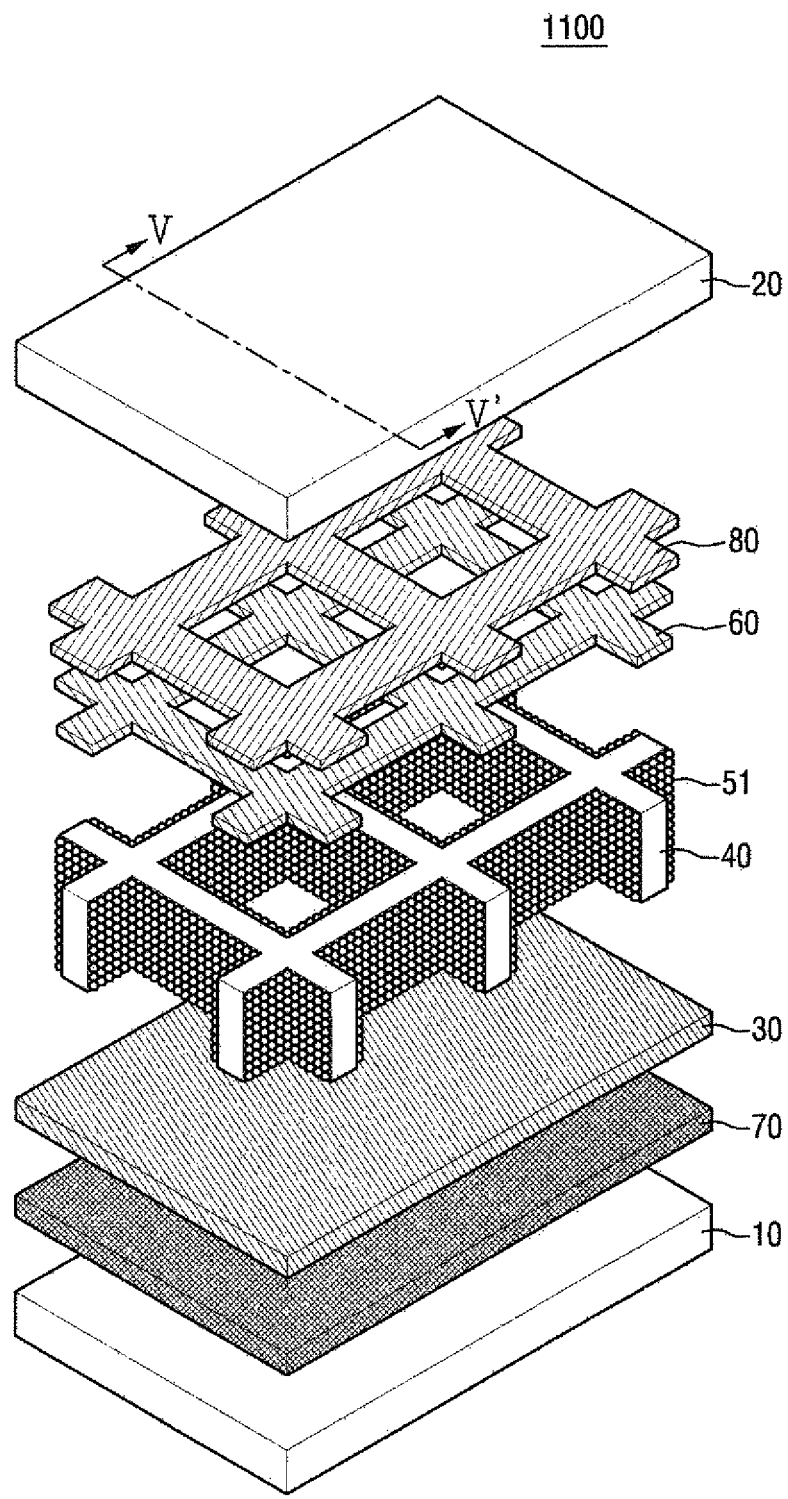
FIG. 4 is an exploded perspective view of a display apparatus according to another embodiment of the present invention.

FIG. 4 is an exploded perspective view of a display apparatus according to another embodiment of the present invention, and FIGS. 5 through 10 are sectional views of display apparatuses according to various embodiments of the present invention.

Figure 5:
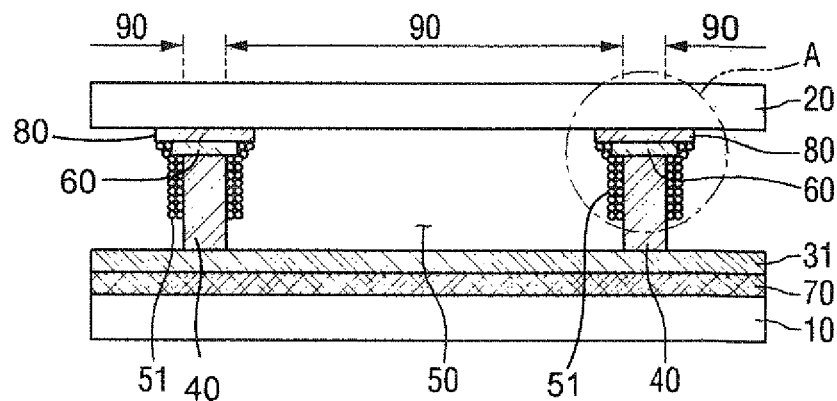
FIGS. 5 through 10 are sectional views of display apparatuses according to various embodiments of the present invention.
Figure 6:
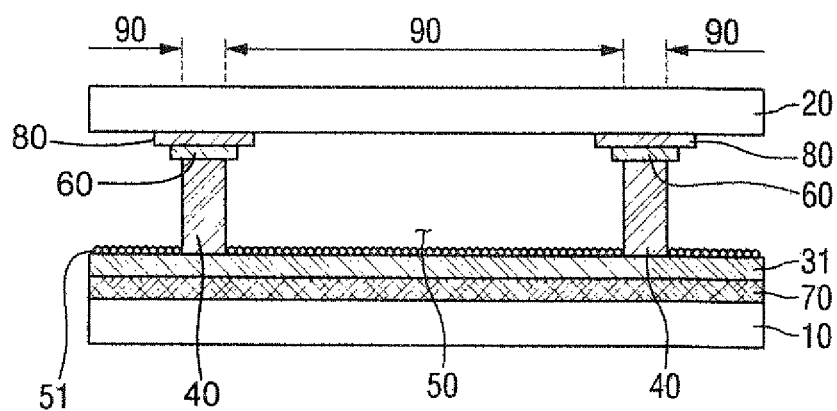

Referring to FIGS. 4 through 6, the display apparatus includes a first substrate 10, a second substrate 20, a second electrode 70, a color absorbing layer 31 disposed on the first substrate 10, a partition wall 40 disposed between the first substrate 10 and the second substrate 20, an electrophoretic layer 50, a first electrode 60 formed between the partition wall 40 and the second substrate 20, and a light blocking layer 80 formed between the first electrode 60 and the second substrate 20.

Since the first substrate 10, the second substrate 20, the partition wall 40 and the electrophoretic layer 50 are the same as those described in FIGS. 1 through 3, repeated descriptions thereof will be omitted.

The second electrode 70 may be formed on the first substrate 10. The second electrode 70 may be formed of a transparent conductive material. Examples of the material forming the second electrode 70 may include indium tin oxide (ITO), indium zinc oxide (IZO), and the like.

Referring to FIG. 5, the second electrode 70 may be formed with respect to only the unit pixel regions defined on the first substrate 10. In such a case, since different voltages may be applied to the second electrode 70 for the respective pixels, the colored charged particles can be controlled for each unit pixel. In some embodiments, the second electrode 70 may be formed on the entire surface of the first substrate 10. In this case, the unit pixel regions defined on the first substrate 10 can be controlled as one pixel region.

The color absorbing layer 31 may be disposed on the first substrate 10. The color absorbing layer 31 absorbs light of a color having a specific wavelength and reflects the light of colors that are not absorbed. Therefore, in a top viewing type display apparatus, some of the light incident from the second substrate 20 of the display apparatus is absorbed by the color absorbing layer 31, and the other is reflected. Thus, only the light of a color reflected by the color absorbing layer 31 can be viewed by a user. In some embodiments, the color absorbing layer 31 may be a black matrix or a color filter. In FIGS. 4 through 6, the color absorbing layer 31 is a black matrix.

Referring to FIGS. 5 and 6, the black matrix 31 may be disposed on the second electrode 70 formed on the first substrate 10. That is to say, the first substrate 10, the second electrode 70 and the black matrix 31 are sequentially disposed in that order.

As described above, the second electrode 70 may be disposed such that only spaced-apart unit pixel regions on the first substrate 10 are occupied by the second electrode 70, and the first substrate 10 may be exposed in spaces of the first substrate 10 between the unit pixel regions without the second electrode 70. In this case, the black matrix 31 may be formed on the second electrode 70, and may fill the spaces between the unit pixel regions without the second electrode 70. In some other embodiments, the spaces between the unit pixel regions without the second electrode 70 may remain empty without being filled with a specific material.

Since the color absorbing layer 31 (black matrix) is formed on the first substrate 10, rather than on the second substrate 20, misalignment may be prevented when the first substrate 10 and the second substrate 20 are assembled. In detail, as described above, the respective unit pixel regions of the first substrate 10 and those of the second substrate 20 are provided in one-to-one correspondence, forming a unit pixel region space. However, when the first substrate 10 and the second substrate 20 are assembled, it is not easy to accurately align the unit pixel regions of the first substrate 10 with the unit pixel regions of the second substrate 20. If the color absorbing layer 31 (black matrix) is formed on the second substrate 20 and misalignment occurs so that two or more pixels of the second substrate 20 are disposed in one unit pixel region of the first substrate 10, color mixing may occur, or color purity may be considerably reduced.

In the embodiment of the present invention, since the color absorbing layer 31 (black matrix) is formed on the first substrate 10 instead of on the second substrate 20, color mixing can be prevented. That is to say, since the color absorbing layer 31 (black matrix) is formed on the first substrate 10, one unit pixel region of the first substrate 10 can display only one color even at misalignment, thereby preventing color mixing and improving color purity.

The first electrode 60 may be formed between the partition wall 40 and the second substrate 20. The first electrode 60 may be formed of a transparent conductive material or a conductive metallic material. Examples of the material forming the first electrode 60 may include indium tin oxide (ITO), indium zinc oxide (IZO), a metal such as chromium (Cr), aluminum (Al), copper (Cu), and the like.

As shown in FIGS. 5 and 6, a left-right width of the first electrode 60 may be larger than that of the partition wall 40. The widths of the first electrode 60 and the partition wall 40 will be described in detail later with reference to FIG. 11.

A light blocking layer 80 may be formed between the first electrode 60 and the second substrate 20. The light blocking layer 80 is provided for the purpose of blocking incident light from the second substrate 20 and reflected light from the first substrate 10. In some embodiments, the light blocking layer 80 may be a black matrix.

As also shown in FIGS. 5 and 6, a left-right width of the light blocking layer 80 may be larger than that of the first electrode 60. The widths of the light blocking layer 80 and the first electrode 60 will be described in detail later with reference to FIG. 11.

Hereinafter, a driving mechanism of the display apparatus according to an embodiment of the present invention, having been described with reference to FIGS. 4 through 6, will be described. For brevity of explanation, it is assumed that the colored charged particles dispersed in the electrophoretic layer 50 are positively charged, but it is obvious that the colored charged particles may also be negatively charged.

In order to drive the EPD apparatus, a positive voltage and a negative voltage may be applied to the first electrode 60 and the second electrode 70, respectively. In some embodiments, a positive voltage may be applied to one of the first electrode 60 and the second electrode 70, and a negative voltage may be applied to the other of the first electrode 60 and the second electrode 70. In other embodiments, a positive voltage or a negative voltage may be applied to both the first electrode 60 and the second electrode 70. However, the absolute values of the voltages applied to the first electrode 60 and the second electrode 70 may be different from each other.

FIG. 5 illustrates a state in which a negative voltage is applied to the first electrode 60 and a positive voltage is applied to the second electrode 70. As the voltages are applied, white charged particles move toward the first electrode 60 so as to then be positioned therearound. When viewed from a top portion of the display apparatus, that is, a top surface of the second substrate 20, the white charged particles, having moved toward the first electrode 60, are blocked by the light blocking layer 80. Therefore, only black can be viewed from the top portion of the display apparatus, that is, the top surface of the second substrate 20.

FIG. 6 illustrates a state in which a positive voltage is applied to the first electrode 60 and a negative voltage is applied to the second electrode 70. As the voltages are applied, white charged particles move toward the second electrode 70 so as to then be positioned therearound. When viewed from a top portion of the display apparatus, that is, a top surface of the second substrate 20, only white light reflected by the white charged particles can be viewed. Therefore, the black-and-white mode EPD apparatus can be implemented according to the above-described driving mechanism.

The second electrode 70 formed on the first substrate 10 and the first electrode 60 formed between the partition wall 40 and the second substrate 20 prevent cross-talk and a loss in the aperture ratio, which will now be described in more detail. As described above, in order to move the colored charged particles dispersed in the electrophoretic layer 50, voltages are applied to the first electrode 60 and the second electrode 70. Accordingly, an electric field is created between the first electrode 60 and the second electrode 70. If the first electrode 60 and the second electrode 70 are formed on one substrate, e.g., the first substrate 10, interference may occur between the first electrode 60 and the second electrode 70, resulting in unintended particle movement and cross-talk. In order to prevent the unintended particle movement and cross talk, it is necessary to provide a sufficient distance between the first electrode 60 and the second electrode 70 formed on the same substrate, so that a width of the light blocking layer 80 formed on the second electrode 70 may increase. Thus, there may be a loss in the aperture ratio. However, if the second electrode 70 is formed on the first substrate 10 and the first electrode 60 is formed on the opposite substrate, specifically, between the partition wall 40 and the second substrate 20, it is easy to secure a sufficient distance between the first electrode 60 and the second electrode 70. Thus, the colored charged particles can be easily controlled, thereby preventing cross-talk and a loss in the aperture ratio.

Figure 7:
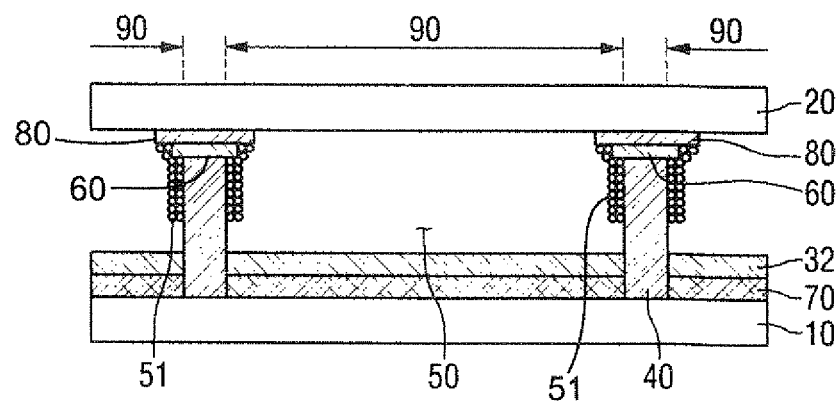

FIG. 7 is a sectional view of a display apparatuses according to another embodiment of the present invention.

Referring to FIG. 7, the display apparatus according to the illustrated embodiment is substantially the same as the display apparatus shown in FIG. 5 except that a color absorbing layer included in the display apparatus is a color filter, and thus repeated descriptions thereof will be omitted.

Referring to FIG. 7, unit pixel regions may include a first unit pixel region for displaying a first color, a second unit pixel region for displaying a second color, and a third unit pixel region for displaying a third color. The first, second and third colors may be different colors. The first, second and third colors may be RGB colors or CMY colors. In some embodiments, the first and third colors may be the same as each other, and the second color may be different from the first and third colors.

A color absorbing layer may be disposed on the first substrate 10, and the color absorbing layer may be a color filter 32. Referring to FIG. 7, the color filter 32 may be disposed on the second electrode 70 formed on the first substrate 10. That is to say, the first substrate 10, the second electrode 70 and the color filter 32 may be sequentially disposed in that order.

The color filter 32 may include first to third color filters formed on regions respectively corresponding to first to third unit pixel regions on the first substrate 10. The first color filter is a color filter for displaying a first color, the second color filter is a color filter for displaying a second color, and the third color filter is a color filter for displaying a third color. The relationship between the first, second and third colors is the same as that between the first, second and third colors for the unit pixel regions, and repeated descriptions thereof will be omitted.

Referring to FIG. 7, white charged particles 51 move toward the first electrode 60 formed between the partition wall 40 and the second substrate 20 to then be positioned therearound. For the purpose of moving the white charged particles 51 toward the first electrode 60, the same voltages as those of FIG. 5 are applied to the first electrode 60 and the second electrode 70, and the white charged particles 51 have the same charges as those in FIG. 5, and thus repeated descriptions thereof will be omitted.

Assuming that light is incident into a top surface of the second substrate 20 shown in FIG. 7, the light passes through the second substrate 20 to reach the color filter 32. If all of the first to third color filters display red, red light can be viewed from the top surface of the second substrate 20. In this way, a color mode EPD apparatus can be implemented.

The color filter 32 formed on the first substrate 10, rather than the second substrate 20, can implement high luminance and high contrast ratio (C/R), and can provide a display apparatus capable of implementing excellent color sensitivity. In detail, if the color filter 32 is formed on the second substrate 20, in order to view light incident on the top surface of the second substrate 20, the light incident on the top surface of the second substrate 20 passes through the color filter 32 twice. Thus, assuming the transmittance of the color filter 32 is approximately 30%, the amount of light that can be viewed from a top portion of the display apparatus is only approximately 9%. In order to form the color filter 32 on the first substrate 10 to display white light, the white charged particles 51 are positioned on the color filter 32 formed on the first substrate 10. In such a case, the light incident from the top portion of the display apparatus passes through the second substrate 20 and is reflected only by the white charged particles 51 without passing through the color filter 32. Therefore, high luminance and high contrast ratio (C/R) can be implemented, and excellent color sensitivity can also be implemented.

Figure 8:
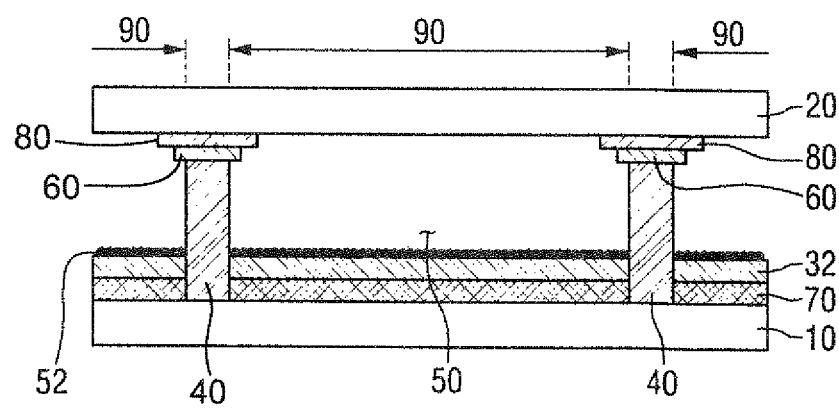
Figure 9:
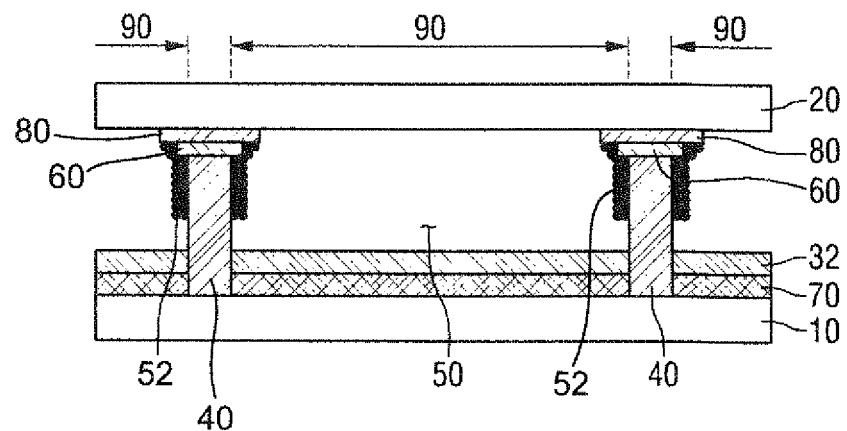

FIGS. 8 and 9 are sectional views of display apparatuses according to various embodiments of the present invention.

Referring to FIGS. 8 and 9, the display apparatuses according to the illustrated embodiments are substantially the same as the display apparatuses shown in FIGS. 6 and 7 except that colored charged particles dispersed in an electrophoretic layer 50 are black charged particles 52, and repeated descriptions thereof will be omitted.

FIG. 8 illustrates a state in which the black charged particles 52 dispersed in the electrophoretic layer 50 are positively charged, a positive voltage is applied to the first electrode 60, and a negative voltage is applied to the second electrode 70. As the voltages are applied, the black charged particles 52 move toward the second electrode 70 so as to then be positioned therearound. When viewed from a top portion of the display apparatus, that is, a top surface of the second substrate 20, only the light reflected by the black charged particles 52, having moved toward the second electrode 70, can be viewed. Therefore, only black light can be viewed from the top surface of the second substrate 20.

FIG. 9 illustrates a state in which the black charged particles 52 dispersed in the electrophoretic layer 50 are positively charged, a negative voltage is applied to the first electrode 60, and a positive voltage is applied to the second electrode 70. As the voltages are applied, the black charged particles 52 move toward the first electrode 60 so as to then be positioned therearound. When viewed from a top portion of the display apparatus, that is, a top surface of the second substrate 20, the color displayed by the color filter 32 disposed on the first substrate 10 can be viewed. In this way, a color mode EPD apparatus can be implemented.

Figure 10:
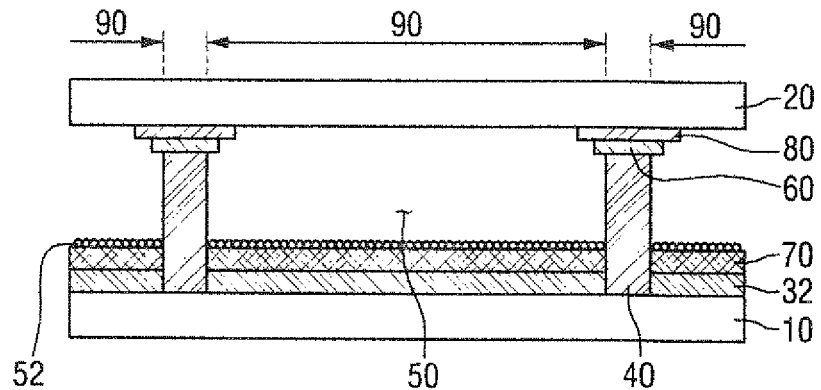

FIG. 10 is a sectional view of a display apparatus according to another embodiment of the present invention.

Referring to FIG. 10, the display apparatus according to the illustrated embodiment is substantially the same as the display apparatus shown in FIG. 6 except that a color filter 32 is disposed on a first substrate 10 and a second electrode 70 is disposed on the color filter 32, and thus repeated descriptions thereof will be omitted.

According to the present invention, the processing sequence of a color absorbing layer, that is, the color filter 32, may be modified in view of processing advantages. For example, the color absorbing layer may be formed before or after forming the second electrode 70 on the first substrate 10.

Figure 11:
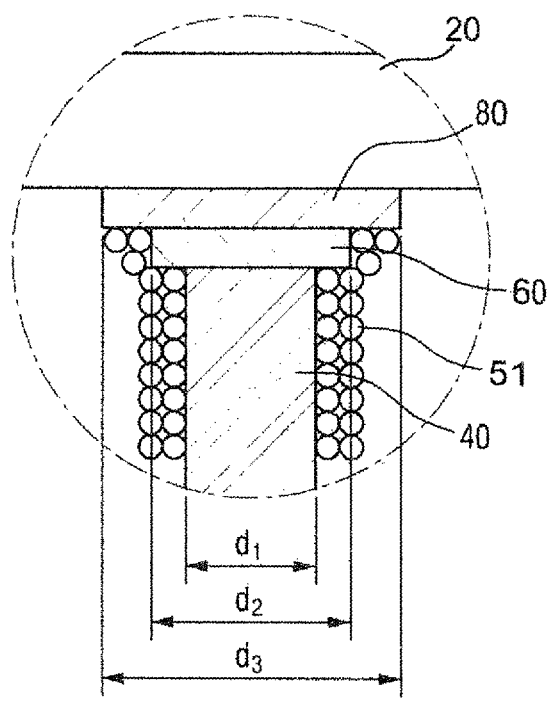
FIG. 11 is an enlarged view of a portion A of FIG. 5.

FIG. 11 is an enlarged view of a portion A of FIG. 5.

Referring to FIGS. 5 and 11, the partition wall 40 is formed between the first substrate 10 and the second substrate 20, the first electrode 60 is formed between the partition wall 40 and the second substrate 20, and the light blocking layer 80 is formed between the first electrode 60 and the second substrate 20. White charged particles 51 dispersed in the electrophoretic layer 50 move toward the first electrode 60 so as to then be positioned thereabout.

Further referring to FIGS. 5 and 11, a width $d_2$ of the first electrode 60 may be larger than the width $d_1$ of the partition wall 40. The larger width $d_2$ of the first electrode 60 may prevent a loss in the aperture ratio. In detail, an electric field can be created according to voltage applied to the first electrode 60 and the second electrode 70 disposed on the first substrate 10, so that the white charged particles 50 move toward the first electrode 60. If the width $d_2$ of the first electrode 60 is equal to or smaller than the width $d_1$ of the partition wall 40, it may be difficult for the white charged particles 50 to move toward the first electrode 60 so as to then be densely positioned therearound. Rather, the white charged particles 50 may be more densely positioned around the second substrate 20 than around the first substrate 10. Thus, when viewed from the top surface of the second substrate 20, an area occupied by the white charged particles 50 may be increased. Here, the color displayed by the color absorbing layer 31 disposed on the first substrate 10, rather than the light reflected by the white charged particles 50, should be viewed from the top surface of the second substrate 20. Thus, the white charged particles 50 should be blocked by the light blocking layer 80. As described above, if a large area is occupied by the white charged particles 50, the area of the light blocking layer 80 is also increased, thereby resulting in a loss in the aperture ratio. However, if a width $d_2$ of the first electrode 60 is larger than the width $d_1$ of the partition wall 40, more white charged particles 50 can be positioned on a bottom surface of the first electrode 60 without the partition wall 40, thereby preventing a loss in the aperture ratio to a certain extent.

Referring to FIG. 11, a width $d_3$ of the light blocking layer 80 may be larger than the width $d_2$ of the first electrode 60. As described above, since an electric field is created between the first electrode 60 and the second electrode 70, the white charged particles 51 move toward the first electrode 60 so as to then be positioned therearound. In this case, the white charged particles 51 may be positioned at left and right sides of the first electrode 60, the width $d_3$ of the light blocking layer 80 is larger than the width $d_2$ of the first electrode 60, which is for the purpose of blocking the white charged particles 51.

Figure 12:
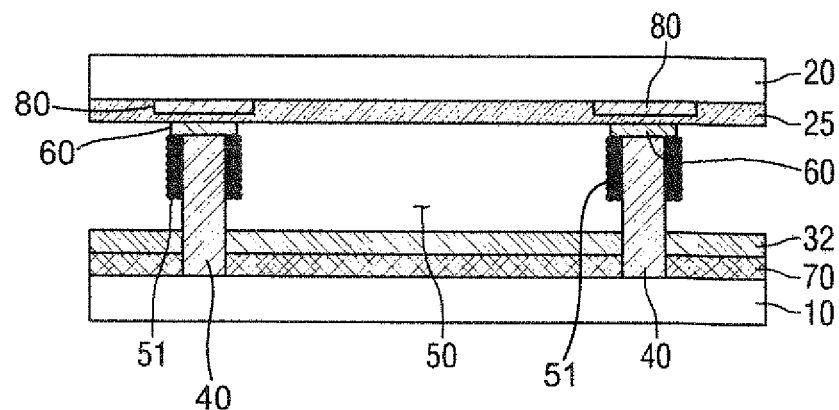
FIGS. 12 and 13 are sectional views of display apparatuses according to various embodiments of the present invention.

FIG. 12 is a sectional view of a display apparatus according to another embodiment of the present invention.

Referring to FIG. 12, the display apparatus according to the illustrated embodiment is substantially the same as the display apparatus shown in FIG. 9 except that an overcoating layer 25 is further formed on a second substrate 20, and thus repeated descriptions thereof will be omitted.

The overcoating layer 25 may be formed on the second substrate 20. The overcoating layer 25 may be formed between the second substrate 20 and a partition wall 40, and may cover a light blocking layer 80 formed on the second substrate 20. Therefore, the second substrate 20, the light blocking layer 80, the overcoating layer 25, the first electrode 60 and the partition wall 40 may be sequentially disposed in that order toward the first substrate 10. In some embodiments, the overcoating layer 25 may cover the light blocking layer 80 and the first electrode 60.

Figure 13:
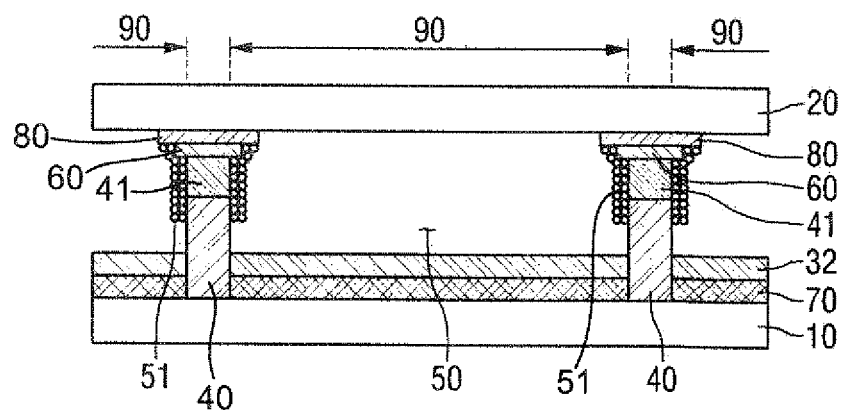

FIG. 13 is a sectional view of a display apparatus according to another embodiment of the present invention.

Referring to FIG. 13, the display apparatus according to the illustrated embodiment is substantially the same as the display apparatus shown in FIG. 7 except that a partition wall 40 includes a third electrode 41 formed adjacent to a first electrode 60, and thus repeated descriptions thereof will be omitted.

The partition wall 40 may includes the third electrode 41 formed in vicinity of the first electrode 60. The third electrode 41 maybe formed of a transparent conductive material or a conductive metallic material. Examples of the material forming the third electrode 41 may include indium tin oxide (ITO), indium zinc oxide (IZO), a metal such as chromium (Cr), aluminum (Al), copper (Cu), and the like.

During driving of the display apparatus, the same voltage may be applied to the first electrode 60 and the third electrode 41. Thus, a relatively strong electric field may be created between the first electrode 60 and the third electrode 41, thereby allowing colored charged particles 51 to be positioned closer to the partition wall 40 than to the first electrode 60. In this case, the width of the light blocking layer 80 formed between the first electrode 60 and the second substrate 20 can be reduced, thereby preventing a loss in the aperture ratio.

Figure 14:
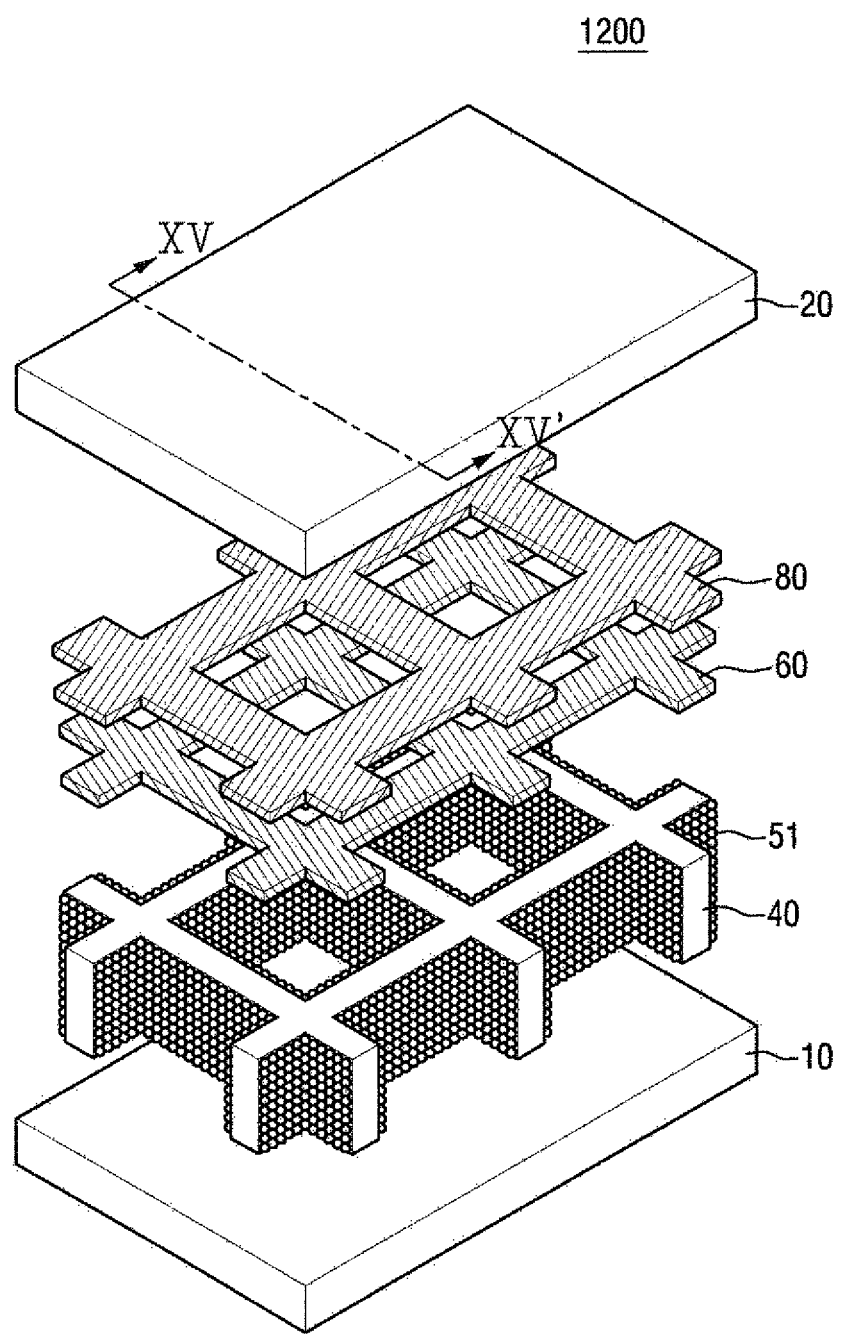
FIG. 14 an exploded perspective view of a display apparatus according to still another embodiment of the present invention.

FIG. 14 an exploded perspective view of a display apparatus according to still another embodiment of the present invention, and FIGS. 15 through 19 are sectional views of display apparatuses according to various embodiments of the present invention.

Figure 15:
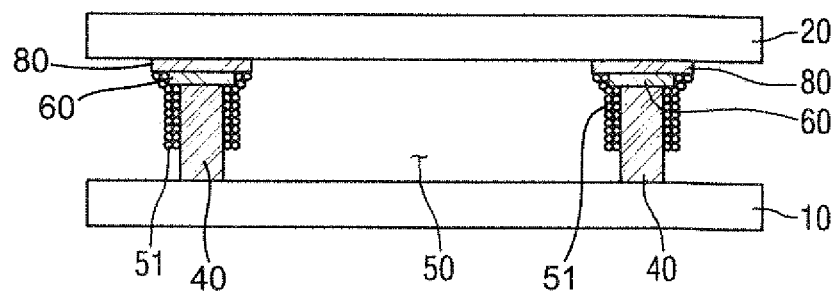
FIGS. 15 through 19 are sectional views of display apparatuses according to various embodiments of the present invention.

Referring to FIGS. 14 and 15, the display apparatus according to the illustrated embodiment includes a first substrate 10, a second substrate 20 facing the first substrate 10, a partition wall 40 disposed between the first substrate 10 and the second substrate 20, a first electrode 60 disposed between the partition wall 40 and the second substrate 20, a light blocking layer 80 formed between the first electrode 60 and the second substrate 20, and an electrophoretic layer 50 having colored charged particles 51 dispersed therein.

Since the first substrate 10, the second substrate 20, the partition wall 40, the first electrode 60, the light blocking layer 80 and the electrophoretic layer 50 are the same as the corresponding components shown in FIGS. 1 through 13, repeated descriptions thereof will be omitted.

In addition, for brevity of explanation, it has been assumed in FIGS. 14 through 19 that the colored charged particles 51 are white charged particles, it is obvious that the colored charged particles 51 may be black charged particles or charged particles of another chromatic color.

Referring to FIG. 15, the white charged particles 51 move toward the first electrode 60 so as to then be positioned therearound. Therefore, the light incident on a top portion of the display apparatus passes through the second substrate 20 so as to then reach the first substrate. As described above, the first substrate 10 may be a transparent substrate made of glass, like the second substrate 20. In such a case, since the light incident from the top portion of the display apparatus also passes through the first substrate 10, the display apparatus according to the illustrated embodiment may serve as a transparent display apparatus.

Figure 16:
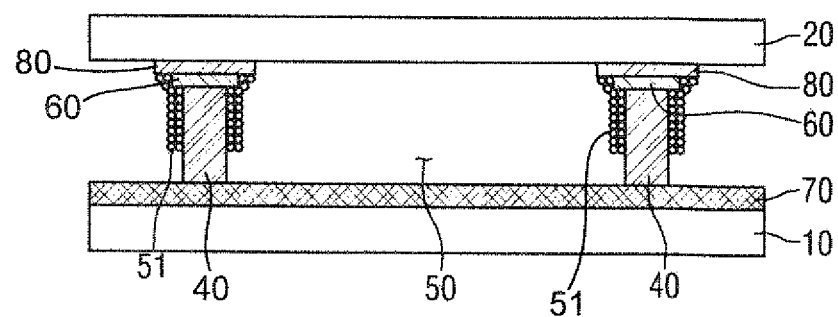
Figure 17:
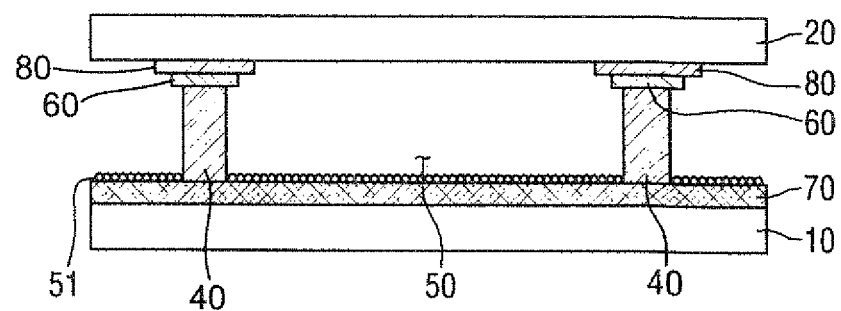

Referring to FIGS. 16 and 17, the display apparatus according to the illustrated embodiment is substantially the same as the display apparatus shown in FIG. 15 except that a second electrode 70 is further formed on a first substrate 10, and thus repeated descriptions thereof will be omitted.

Referring to FIG. 16, white charged particles 51 move toward the first electrode 60 so as to then be positioned therearound. Thus, the light incident from a top portion of the display apparatus passes through the second substrate 20 so as to then reach the first substrate 10. As described above, the first substrate 10 may be a transparent substrate made of glass, like the second substrate 20. In addition, the second electrode 70 may be formed of a transparent conductive material such as indium tin oxide (ITO), indium zinc oxide (IZO), and the like. In such a case, the light incident from the top portion of the display apparatus passes through the first substrate 10 so that the display apparatus according to the illustrated embodiment may serve as a transparent display apparatus.

Referring to FIG. 17, the white charged particles 51 move toward the second electrode 70 so as to then be positioned therearound. Therefore, the light incident from the top potion of the display apparatus passes through the second substrate 20, but cannot reach the first substrate 10 so as to then be reflected by the white charged particles 51. In that case, white light can be viewed from the top potion of the display apparatus.

For brevity of explanation, the illustrated embodiment shows that the colored charged particles are white charged particles. However, as described above, the colored charged particles may be black charged particles. In that case, the light incident from the top potion of the display apparatus passes through the second substrate 20 and reaches the black charged particles without reaching the first substrate 10. In that case, black light can be viewed from the top potion of the display apparatus.

Figure 18:
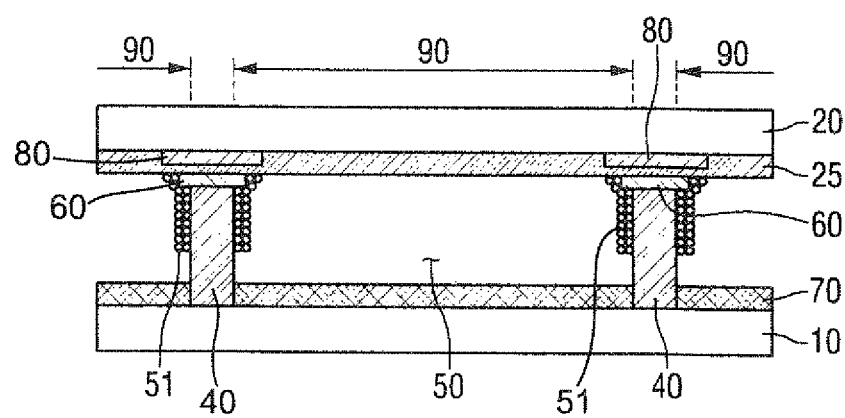

Referring to FIG. 18, the display apparatus according to the illustrated embodiment is substantially the same as the display apparatus shown in FIG. 16 except that an overcoating layer 25 is further formed on a second substrate 20, and thus repeated descriptions thereof will be omitted.

The overcoating layer 25 may be formed on the second substrate 20. The overcoating layer 25 may be formed between the second substrate 20 and a partition wall 40, and may cover a light blocking layer 80 formed on the second substrate 20. Therefore, the second substrate 20, the light blocking layer 80, the overcoating layer 25, the first electrode 60 and the partition wall 40 may be sequentially disposed in that order toward the first substrate 10. In some embodiments, the overcoating layer 25 may cover the light blocking layer 80 and the first electrode 60.

Figure 19:
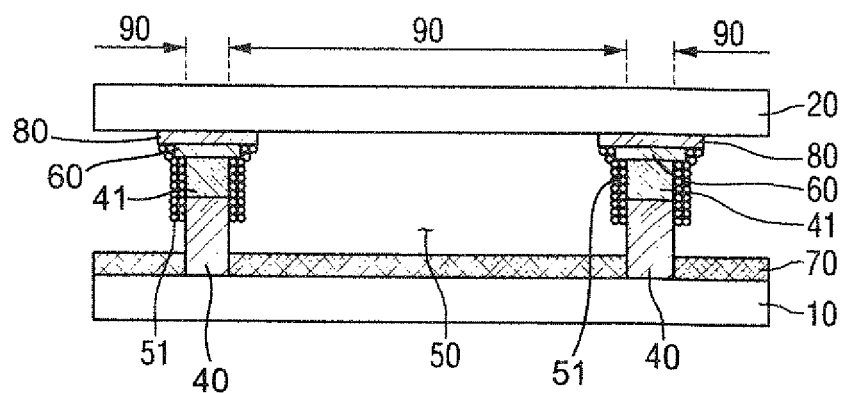

Referring to FIG. 19, the display apparatus according to the illustrated embodiment is substantially the same as the display apparatus shown in FIG. 16 except that a partition wall 40 includes a third electrode 41 formed adjacent to a first electrode 60, and thus repeated descriptions thereof will be omitted.

The partition wall 40 may include the third electrode 41 formed in vicinity of the first electrode 60. The third electrode 41 maybe formed of a transparent conductive material or a conductive metallic material. Examples of the material forming the third electrode 41 may include indium tin oxide (ITO), indium zinc oxide (IZO), a metal such as chromium (Cr), aluminum (Al), copper (Cu), and the like.

During driving of the display apparatus, the same voltage may be applied to the first electrode 60 and the third electrode 41. Thus, a relatively strong electric field may be created between the first electrode 60 and the third electrode 41, thereby allowing colored charged particles 51 to be positioned closer to the partition wall 40 than to the first electrode 60. In this case, the width of the light blocking layer 80 formed between the first electrode 60 and the second substrate 20 can be reduced, thereby preventing a loss in the aperture ratio.

Figure 20:
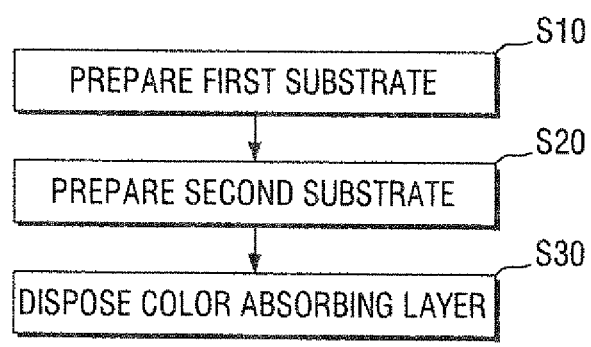
FIG. 20 is a flowchart illustrating a method for manufacturing a display apparatus according to an embodiment of the present invention.

FIG. 20 is a flowchart illustrating a method for manufacturing a display apparatus according to an embodiment of the present invention.

The method for manufacturing a display apparatus according to the embodiment of the present invention may include preparing a first substrate having one or more unit pixel regions defined and including a thin film transistor connected to gate lines and data line of the unit pixel regions (S10). Since the first substrate, the unit pixel regions of the first substrate 10 and the thin film transistor are substantially the same as corresponding components described in FIGS. 1 through 13, repeated descriptions thereof will be omitted.

Next, a second substrate facing the first substrate is prepared on the first substrate (S20). Since the second substrate is substantially the same as the corresponding substrates described in FIGS. 1 through 13, repeated descriptions thereof will be omitted.

A partition wall may be disposed between the first substrate and the second substrate, and an electrophoretic layer having colored charged particles dispersed therein may be formed between the first substrate and the second substrate. Since the partition wall and the electrophoretic layer are substantially the same as corresponding components described in FIGS. 1 through 13, repeated descriptions thereof will be omitted.

A first electrode may be disposed between the partition wall and the second substrate, a light blocking layer may be disposed between the first electrode and the second substrate, and the second electrode may be disposed on the first substrate. Since the first electrode, the second electrode and the light blocking layer are substantially the same as corresponding components described in FIGS. 1 through 13, repeated descriptions thereof will be omitted.

The second electrode formed on the first substrate and the first electrode formed between the partition wall and the second substrate may prevent cross-talk and a loss in the aperture ratio. In detail, in order to move the colored charged particles dispersed in the electrophoretic layer, voltages are applied to the first electrode and the second electrode. Accordingly, an electric field is created between the first electrode and the second electrode. If the first electrode and the second electrode are formed on one substrate, e.g., the first substrate, interference may occur between the first electrode and the second electrode, resulting in unintended particle movement and cross-talk. In order to prevent the unintended particle movement and cross talk, it is necessary to provide a sufficient distance between the first electrode and the second electrode formed on the same substrate so that the width of the light blocking layer formed on the second electrode may increase. Thus, there may be a loss in the aperture ratio. However, if the second electrode is formed on the first substrate and the first electrode is formed on the opposite substrate, specifically, between the partition wall and the second substrate, it is easy to provide a sufficient distance between the first electrode and the second electrode. Thus, the colored charged particles can be easily controlled, thereby preventing cross-talk and a loss in the aperture ratio.

Next, a color absorbing layer is disposed on the first substrate (S30). Since the color absorbing layer is substantially the same as the corresponding color absorbing layer described in FIGS. 1 through 13, repeated descriptions thereof will be omitted.

The disposing of the color absorbing layer may include disposing the color absorbing layer between the first substrate and the second electrode. Alternatively, the disposing of the color absorbing layer may include disposing the color absorbing layer on the second electrode.

Since the color absorbing layer is formed on the first substrate, rather than on the second substrate, misalignment may be prevented when the first substrate and the second substrate are assembled. In detail, the respective unit pixel regions of the first substrate and those of the second substrate are provided in one-to-one correspondence, forming a unit pixel region space. However, when the first substrate and the second substrate are assembled, it is not easy to accurately align the unit pixel regions of the first substrate with the unit pixel regions of the second substrate.

If the color absorbing layer is formed on the second substrate and misalignment occurs so that two or more pixels of the second substrate are disposed in one unit pixel region of the first substrate, color mixing may occur, or color purity may be considerably reduced.

In the embodiment of the present invention, since the color absorbing layer is formed on the first substrate instead of the second substrate, color mixing can be prevented. That is to say, since the color absorbing layer is formed on the first substrate, one unit pixel region of the first substrate can display only one color even at misalignment, thereby preventing color mixing and improving color purity.

In addition, the color filter formed on the first substrate rather than the second substrate can implement high luminance, high contrast ratio (C/R), and excellent color sensitivity.

In detail, if the color filter is formed on the second substrate, in order to view light incident on the top surface of the second substrate, the light incident on the top surface of the second substrate passes through the color filter twice. Thus, assuming the transmittance of the color filter is approximately 30%, the amount of light that can be viewed from a top portion of the display apparatus is only approximately 9%. In order to form the color filter on the first substrate so as to display white light, the white charged particles are positioned on the color filter formed on the first substrate. In such a case, the light incident from the top portion of the display apparatus passes through the second substrate and is reflected only by the white charged particles without passing through the color filter. Therefore, high luminance and high contrast ratio (C/R) can be implemented, and excellent color sensitivity can also be implemented.

The forming of the first electrode may include forming the first electrode such that a width of the first electrode is larger than that of the partition wall. The forming of the light blocking layer may include forming the light blocking layer such that a width of the light blocking layer is larger than that of the first electrode.

The larger width of the first electrode relative to the width of the partition wall may prevent a loss in the aperture ratio. In detail, an electric field can be created according to voltage applied to the first electrode and the second electrode disposed on the first substrate so that the white charged particles move toward the first electrode along the created electric field. If the width of the first electrode is equal to or smaller than that of the partition wall, it may be difficult for the white charged particles to be densely positioned around the first electrode. Rather, the white charged particles may be more densely positioned around the second substrate than around the first substrate. Thus, when viewed from the top surface of the second substrate, an area occupied by the white charged particles may be increased. Here, the color displayed by the color absorbing layer disposed on the first substrate, rather than the light reflected by the white charged particles, should be viewed from the top surface of the second substrate. Thus, the white charged particles should be blocked by the light blocking layer. As described above, if a large area is occupied by the white charged particles, the area of the light blocking layer is also increased, thereby resulting in a loss in the aperture ratio. However, if the width of the partition wall is larger than that of the first electrode, more white charged particles can be positioned on a bottom surface of the first electrode without the partition wall, thereby preventing a loss in the aperture ratio to a certain extent.

The width of the light blocking layer may be larger than that of the first electrode. As described above, since an electric field is created between the first electrode and the second electrode, the white charged particles move toward the first electrode along the electric field created between the first electrode and the second electrode. In this case, the white charged particles may be positioned at left and right sides of the first electrode, and the width of the light blocking layer is larger than that of the first electrode, which is for the purpose of blocking the white charged particles.

The forming of the partition wall may include forming the third electrode adjacent to the first electrode.

During driving of the display apparatus, the same voltage may be applied to the first electrode and the third electrode. Thus, a relatively strong electric field may be created between the first electrode and the third electrode, thereby allowing colored charged particles to be positioned closer to the partition wall than to the first electrode. In this case, the width of the light blocking layer formed between the first electrode and the second substrate can be reduced, thereby preventing a loss in the aperture ratio.

While the present invention has been particularly shown and described with reference to exemplary embodiments thereof, it will be understood by those of ordinary skill in the art that various changes in form and detail may be made therein without departing from the spirit and scope of the present invention as defined by the following claims. It is, therefore, desired that the present embodiments be considered in all respects as illustrative and not restrictive, reference being made to the appended claims rather than to the foregoing description to indicate the scope of the invention.

What is claimed is:

1. A display apparatus, comprising:
    a first substrate having at least one unit pixel region defined;
    a second substrate disposed on the first substrate and facing the first substrate;
    a color absorbing layer disposed on the first substrate;
    a partition wall disposed between the first substrate and the second substrate, on the color absorbing layer, and separating the unit pixel regions from each other;
    a first electrode formed between the partition wall and the second substrate;
    a second electrode formed between the first substrate and the color absorbing layer over the whole of the first substrate;
    an electrophoretic layer formed between the first substrate and the second substrate, the electrophoretic layer comprising colored charged particles dispersed therein; and a light blocking layer formed between the first electrode and the second substrate.

2. The display apparatus of claim 1, wherein the color absorbing layer is a black matrix, and the colored charged particles are white charged particles.

3. The display apparatus of claim 1, wherein the color absorbing layer is a color filter for displaying a color of red, green and blue, and the colored charged particles are one of white charged particles and black charged particles.

4. The display apparatus of claim 1, wherein the partition wall includes a third electrode formed adjacent to the first electrode.

5. The display apparatus of claim 4, wherein the first electrode and the third electrode are metal electrodes, and the second electrode is a transparent electrode.

6. A display apparatus, comprising:
a first substrate having at least one unit pixel region defined and including a driving thin film transistor;
a second substrate disposed on the first substrate and facing the first substrate;
a partition wall disposed between the first substrate and the second substrate;
a first electrode formed between the partition wall and the second substrate; and
a light blocking layer formed between the first electrode and the second substrate.

7. The display apparatus of claim 6, further comprising an electrophoretic layer formed between the first substrate and the second substrate, wherein the electrophoretic layer includes colored charged particles dispersed therein.

8. The display apparatus of claim 7, further comprising a second electrode disposed on the first substrate.

9. The display apparatus of claim 8, wherein the partition wall includes a third electrode formed adjacent to the first electrode.

10. The display apparatus of claim 9, wherein the first electrode and the third electrode are metal electrodes, and the second electrode is a transparent electrode.

11. The display apparatus of claim 8, wherein a width of the first electrode is greater than a width of the partition wall, and a width of the light blocking layer is greater than a width of the first electrode.

12. A method for manufacturing a display apparatus, comprising the steps of:
preparing a first substrate having at least one unit pixel region defined;
preparing a second substrate disposed on the first substrate and facing the first substrate;
disposing a color absorbing layer on the first substrate;
forming a partition wall between the first substrate and the second substrate, on the color absorbing layer;
forming a first electrode between the partition wall and the second substrate;
forming a second electrode between the first substrate and the color absorbing layer over the whole of the first substrate;
disposing an electrophoretic layer, including colored charged particles dispersed therein, between the first substrate and the second substrate; and
forming a light blocking layer between the first electrode and the second substrate.

13. The method of claim 12, wherein the step of disposing the color absorbing layer comprises disposing the color absorbing layer on the second electrode.

14. The method of claim 13, wherein the color absorbing layer is a black matrix, and the colored charged particles are white charged particles.

15. The method of claim 13, wherein the color absorbing layer is a color filter for displaying a color of red, green and blue, and the colored charged particles are one of white charged particles and black charged particles.

16. The method of claim 12, wherein the step of forming the partition wall comprises forming a third electrode adjacent to the first electrode.

17. The method of claim 16, wherein the first electrode and the third electrode are metal electrodes, and the second electrode is a transparent electrode.

18. The method of claim 12, wherein the step of forming the first electrode comprises forming the first electrode having a width larger than a width of the partition wall, and step of forming the light blocking layer comprises forming the light blocking layer having a width larger than a width of the first electrode.

* * * * *